United States Patent [19]

Richardson

[11] 4,348,757
[45] Sep. 7, 1982

[54] TRANSCEIVERS

[75] Inventor: Christopher K. Richardson, Romsey, England

[73] Assignee: Plessey Handel und Investments AG, Zug, Switzerland

[21] Appl. No.: 161,786

[22] Filed: Jun. 23, 1980

[30] Foreign Application Priority Data

Jun. 29, 1979 [GB] United Kingdom ............... 7922701

[51] Int. Cl.³ ............................................. H04J 3/04
[52] U.S. Cl. ........................................ 370/32; 370/24
[58] Field of Search ........................... 370/32, 24, 20

[56] References Cited

U.S. PATENT DOCUMENTS 4,127,816 11/1978 Grosso et al. ...................... 370/24
4,134,068 1/1979 Richardson ........................ 370/24

Primary Examiner—Richard Murray
Attorney, Agent, or Firm—Fleit & Jacobson

[57] ABSTRACT

According to the present invention a common channel duplex a.m. transceiver comprises a pair of multiplicative mixers arranged to receive signals from two sources, receiver aerial means constituting one of the sources and arranged to feed received signals to the multiplicative mixers, transmitter aerial means, and oscillator/modulator means constituting the other of the sources and arranged to feed signals for transmission to the transmitter aerial means and to provide for the mixers of the pair, local oscillator signals which are at the same frequency as the carrier frequency for transmission and wherein it is arranged that the carrier frequency for transmission and the carrier frequency of the received signal are common to a single channel of the transceiver, phase quadrature means connected to provide a phase quadrature relationship between two signals fed to the mixers of the pair from one of the said sources, a pair of signal combiners fed one from each mixer, a pair of low-pass filters fed one from each combiner, a pair of correlator arrangements each having first and second input ports and an output port, the first input port of each correlator arrangement being fed one from each low-pass filter, detector means via which signals from the oscillator/modulator means are fed to respective second input ports of the correlators, the correlator arrangements being operative to correlate signals derived from the low-pass filters with detected signals from the oscillator/modulator means thereby to provide at the said output ports feedback signals which are fed one from each correlator to respective combiners, and an a.m. demodulator responsive to signals fed from the low-pass filters for providing a.m. output signals corresponding a.m. modulation carried by the received signals.

8 Claims, 3 Drawing Figures

TRANSCEIVERS

This invention relates to common channel duplex transceivers.

A common channel duplex transceiver is a transmitter/receiver which is capable of receiving signals and transmitting signals contemporaneously on the same channel. A common channel duplex (CCD) transceiver suitable for f.m. operation is described in our U.K. Patent Application No. 10360/76. The present invention is however concerned more especially with an a.m.C.C.D. transceiver.

According to the present invention a common channel duplex a.m transceiver comprises a pair of multiplicative mixers arranged to receive signals from two sources, receiver aerial means constituting one of the sources and arranged to feed received signals to the multiplicative mixers, transmitter aerial means, and oscillator/modulator means constituting the other of the sources and arranged to feed signals for transmission to the transmitter aerial means and to provide for the mixers of the pair, local oscillator signals which are at the same frequency as the carrier frequency for transmission and wherein it is arranged that the carrier frequency for transmission and the carrier frequency of the received signal are common to a single channel of the transceiver, phase quadrature means connected to provide a phase quadrature relationship between two signals fed to the mixers of the pair from one of the said sources, a pair of signal combiners fed one from each mixer, a pair of low-pass filters fed one from each combiner, a pair of correlator arrangements each having first and second input ports and an output port, the first input port of each correlator arrangement being fed one from each low-pass filter, detector means via which signals from the oscillator/modulator means are fed to respective second input ports of the correlators, the correlator arrangements being operative to correlate signals derived from the low-pass filters with detected signals from the oscillator/modulator means thereby to provide at the said output ports feedback signals which are fed one from each correlator to respective combiners, and an a.m. demodulator responsive to signals fed from the low-pass filters for providing a.m. output signals corresponding to a.m. modulation carried by the received signals.

The common channel duplex a.m. transceiver may include a delay device via which signals from the oscillator/modulator means are fed to the mixers of the pair, the delay introduced by the said device being chosen to compensate for delay experienced by signals fed back from the transmitter aerial to the receiver aerial whereby cancellation of these unwanted signals in the combiners is optimised.

The correlator arrangements may each comprise first and second multiplicative mixers each of the said first and second multiplicative mixers having two input terminals and an output terminal, one input terminal of each of the said mixers being coupled to the said first input port, the other input terminal of each mixer of the correlator arrangement being coupled to the second input port, differentiator means via which the said other input terminal of the first mixer is coupled to the second input port, first and second low-pass filters fed respectively from the output terminals of the first and second mixers of the correlator arrangement and first and second voltage controllable potential divider means each having a control signal input terminal and two other terminals, the control signal input terminal of the said first and second voltage controllable potential divider means being fed from the first and second filters respectively, the first said potential divider means being connected by means of its said other terminals between the said other input terminal of the said first mixer of the correlator arrangement and the output port thereof and the said second potential divider means being similarly connected between the said second mixer of the correlator arrangement and the output port of the correlator arrangement.

The voltage controllable potential divider means may comprise a voltage variable resistor connected effectively in series with a 180° phase shift device, the voltage variable resistor and the said phase shift device being connected in parallel with a further resistor, the control signal input terminal forming part of the voltage variable resistor and the parallel combination of the resistor and the voltage variable resistor and the 180° phase shift means including the two other terminals which are provided one at each end of the said parallel combination.

The a.m. demodulator may comprise two squarers fed respectively from the said pair of low-pass filters, output signals from the squarers being fed to a signal combiner an output signal from the signal combiner being fed to a square rooting device which provides an a.m. output signal corresponding to a.m. modulation carried by the received signals.

Alternatively, the a.m. demodulator may comprise two full-wave rectifiers fed respectively from the said pair of low-pass filters and arranged to feed a signal combiner which provides a.m. output signals corresponding to a.m. modulation carried by the received signals.

The phase quadrature means may be connected so that the local oscillator signals fed from the oscillator/modulator means to the pair of multiplicative mixers are in phase quadrature.

Alternatively the phase quadrature means may be connected so that received signals fed from the receiver aerial means to the pair of multiplicative mixers are in phase quadrature. It should be understood that the phase quadrature means includes any device or arrangement for producing a phase quadrature relationship between the signals fed to the mixers and for example it is envisaged that the phase quadrature relationship may be achieved by suitable spacing of two aerials so that received signals fed to the pair of multiplicative mixers bear a phase quadrature relationship to each other.

Although the present invention is concerned especially with an a.m. common channel duplex transceiver, it is envisaged that a system for receiving a.m. and f.m. may be provided wherein the f.m. system is a system as of the kind described in our U.K. patent application No. 10360/76.

Some embodiments of the invention will now be described by way of example with reference to the accompanying drawings in which:

FIG. 2 is a generally schematic block diagram of an a.m. demodulator for use with the transceiver of FIG. 1; and wherein

Figure 1:
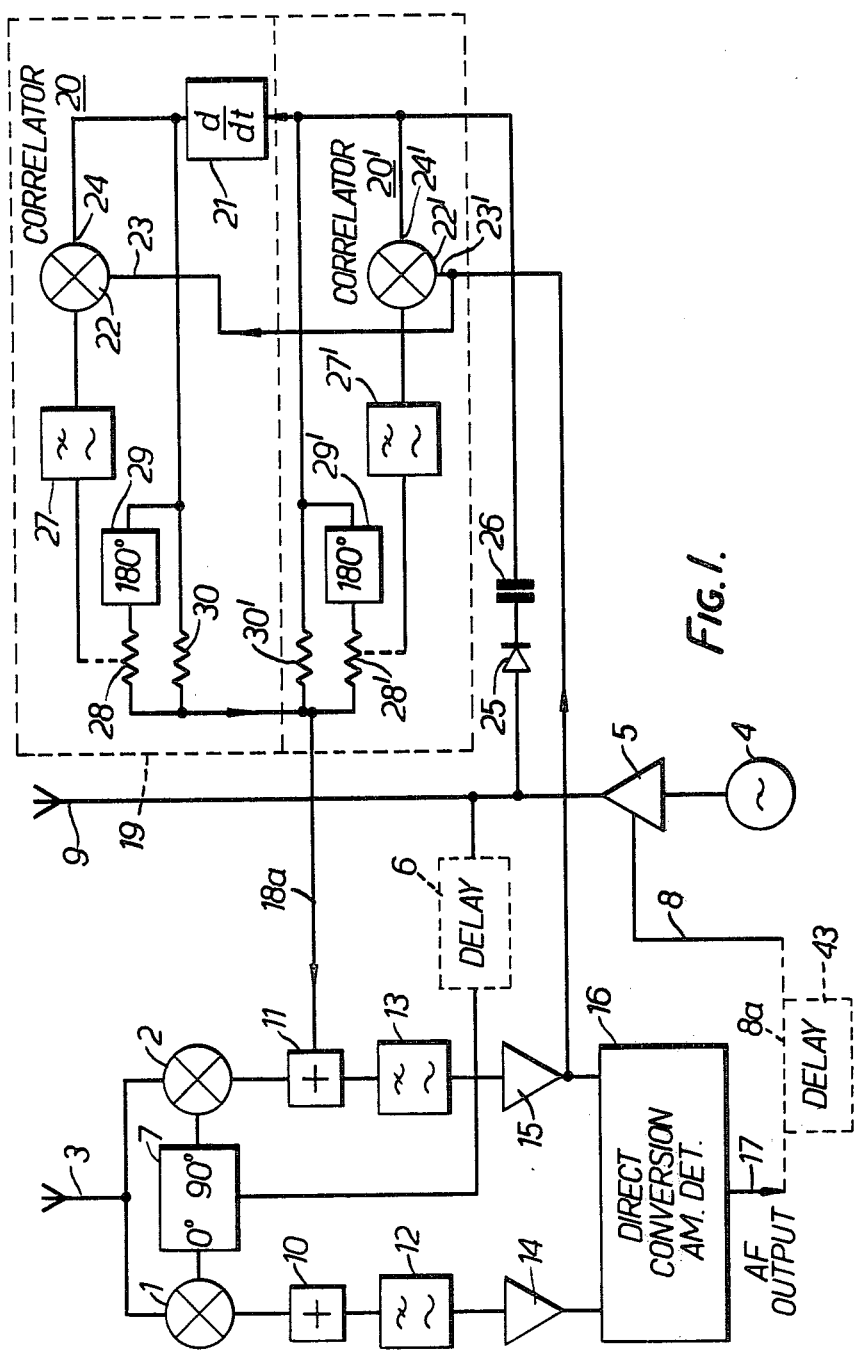
FIG. 1 is a generally schematic block diagram of a common channel duplex a.m. transceiver.

Referring now to FIG. 1 and a.m. transceiver comprises a pair of multiplicative mixers 1 and 2 fed with received signals from an aerial 3. Local oscillator signals for the mixers 1 and 2 are provided by a local oscillator 4 arranged to feed the mixers in phase quadrature via a modulator 5, a delay device 6 and a phase quadrature device 7. The modulator 5 serves as a power amplifier for signals from the oscillator 4 and receives a modulating signal on line 8 from a suitable source of a.m. modulation. Modulated output signals from the modulator 5 are radiated from the transceiver via a transmitter aerial 9. Output signals from the mixers 1 and 2 are fed to combiners 10 and 11 respectively which are arranged to feed low-pass filters 12 and 13 respectively. Output signals from the low-pass filters 12 and 13 are fed to amplifiers 14 and 15 respectively which are connected to feed an a.m. direct conversion detector or demodulator 16. An a.f. output signal corresponding to a.m. modulation received at the aerial 3 is provided from the demodulator 16 on line 17.

In order to cancel unwanted feedback, which is unavoidably fed back to the receiver aerial 3, from the transmitter aerial 9, a modulation sample from the modulator 5 is correlated with the received signal present at the output of the amplifiers 14 and 15 and suitable feedback signals are developed which are applied on lines 18a and 18b to combiners 11 and 10 respectively. Since the combiners 10 and 11 are fed from similar correlator arrangements only one of such arrangements is shown in FIG. 1. The correlator arrangement is shown within broken line 19 and comprises two correlators 20 and 20'. The correlator 20 is identical with the correlator 20' apart from the fact it is fed at one input via a differentiator 21 and therefore corresponding parts of the correlators 20 and 20' have been given the same numerical designations distinguished only by a dash suffix.

The correlator 20' comprises a mixer 22' fed at one input terminal 23' with a signal from the output of the amplifier 15 and at the other input terminal 24' with a signal from the modulated 5 which is fed via a detector 25 and a smoothing capacitor 26. Thus the signal fed via terminal 24' to the mixer 22' corresponds to the a.m. modulation on line 8, and is correlated with the output signal from the amplifier 15. Output signals from the mixer 22' are fed via a filter 27' to control the resistance of a voltage variable resistor 28'. The voltage variable resistor 28' is connected in series with a 180° phase shift device 29', which might conveniently comprise a transformer, and the serial combination of the parts 28' and 29' are connected in parallel with a further resistor 30' to form a voltage sensitive potential divider arrangement which is connected to feed the combiner 11 via line 18a and to receive signals from the detector 25 via the capacitor 26. The correlator 20 of the correlator arrangement shown within the broken line 19, serves also to provide a feedback correction signal on the line 18a but by reason of the fact that multiplicative mixer 22 is fed from detector 25 via the differentiator 21 a phase quadrature correction signal is provided. It is envisaged that the correlator arrangement 19 may for some purposes comprise only those parts shown which bear the dashed suffix but for the most efficient unwanted signal cancellation the full correlator arrangement shown within broken line 19 is required.

As hereinbefore explained the combiner 10 is fed via line 18b in a similar manner to the combiner 11 thereby to provide suitable cancellation of unwanted feedback in the output lines from the mixers 1 and 2.

Figure 2:
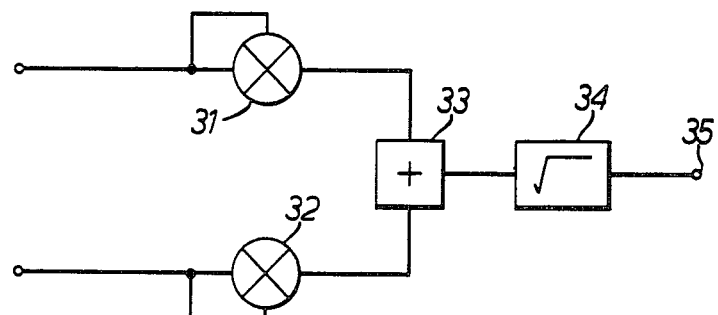
Figure 3:
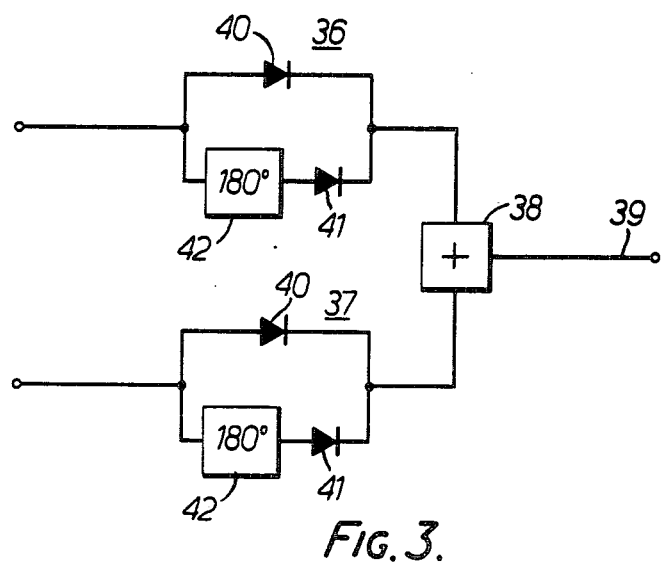
FIG. 3 is a generally schematic block diagram of an alternative a.m. demodulator for use with the transceiver of FIG. 1.

The direct conversation a.m. detector or demodulator 16 may comprise a pair of squarers 31, 32 as shown in FIG. 2 which are fed from the amplifiers 14 and 15 respectively. Output signals from the squarers 31 and 32 are fed to an additive combiner 33 which in turn is arranged to feed a square rooting device 34, an output signal from the square rooting device being provided on a line 35 which provides an audio frequency output signal corresponding to the a.m. modulation received at the aerial 3. It will be appreciated that by reason of the operation of the correlators 20 and 20' in combination with the combiners 10 and 11 feedback between the aerials 9 and 13 is cancelled.

Alternatively the demodulator 16 may comprise a pair of full-wave rectifiers 36 and 37 which are arranged to feed an additive combiner 38, an output signal being provided on output line 39 from the additive combiner 38. The full-wave rectifiers 36 and 37 are fed from the amplifiers 14 and 15 respectively as shown in FIG. 1 and the full-wave rectifiers 36, 37 may be identical. The full-wave rectifiers may take any convenient form and as shown in the drawing they may comprise for example a pair of diodes 40, 41 and a phase shift device 42 providing a 180° phase shift. Conveniently the phase shift device may comprise a transformer.

The transceiver hereinbefore described enables an a.m. signal to be received and transmitted on the same frequency channel. Signals which are fed back from the transmission aerial 9 to the receiving aerial 3 are suppressed by the injection of A.F. cancelling waveforms which are fed to the combiners 10 and 11. Because cancellation takes place at low frequency or audio frequency a very high degree of suppression of the unwanted feedback signal is achieved.

The audio signal outputs at the amplifier 14 and 15 are applied to a pair of correlators such as the correlator 19 which receives reference signals derived from the transmitted modulation. These unwanted signals present at the output of the amplifiers 14 and 15 which are due to feedback between the aerials 9 and 13, is highly correlated with a reference signal derived from the modulator 5 due to the fact that a very small delay occurs in the transmitter received demodulator path. On the other hand the wanted received signal is virtually uncorrelated with the re-transmitted signal. The outputs from the correlators 20 and 20' after low-pass filtering apply slowly varying d.c. levels, which are in effect a measure of the level of the unwanted signal at the output from the amplifiers 14 and 15, and these levels are used to control the level and phase of the cancelling waveforms fed to the combiners 10 and 11.

It will be appreciated that in order to provide a radio relay function received modulation on line 17 may be fed back via broken line 8a to modulator 5 for re-transmission from the aerial 9.

For radio relay operation a delay device 43 is connected between the line 17 and the line 8 so that correlation of the wanted signal is destroyed whereby the unwanted signal only is cancelled in the combiners 10 and 11.

Various modifications may be made to the arrangement shown without departing from the scope of the invention and for example the phase quadrature device 7 may be connected alternatively to produce a phase quadrature relationship between the received signals applied to the mixers 1 and 2 from the aerial 3.

What we claim is:

1. A common channel duplex a.m. transceiver comprising a pair of multiplicative mixers arranged to receive signals from two sources, receiver aerial means constituting one of the sources and arranged to feed received signals to the multiplicative mixers, transmitter aerial means, and oscillator/modulator means constituting the other of the sources and arranged to feed signals for transmission to the serial means and to provide for the mixers of the pair local oscillator signals which are at the same frequency as the carrier frequency for transmission, and wherein it is arranged that the carrier frequency for transmission and the carrier frequency of the received signals are common to a single channel of the transceiver, phase quadrature means connected to provide a phase quadrature relationship between two signals fed to the mixers of the pair from one of the sources, a pair of signal combiners fed one from each mixer, a pair of low pass filters fed one from each combiner, a pair of correlator arrangements each having first and second input ports and an output port, the first input port of each correlator arrangement being fed one from each low pass filter, detector means via which signals from the oscillator/modulator means are fed to respective second input ports of the correlators, the correlator arrangements being operative to correlate signals derived from the low pass filters with detected signals from the oscillator/modulator means thereby to provide at the said output ports feedback signals which are fed one from each correlator to respective combiners, and an a.m. demodulator responsive to signals fed from the low pass filters for providing a.m. output signals corresponding to a.m. modulation carried by the received signals.

2. A common channel duplex a.m. transceiver as claimed in claim 1 including a delay device via which signals from the oscillator/modulator means are fed to the mixers of the pair, the delay introduced by the said device being chosen to compensate for delay experienced by signals fed back from the transmitter aerial to the receiver aerial whereby cancellation of unwanted signals in the combiners is optimised.

3. A common channel duplex a.m. transceiver as claimed in claim 1 or claim 2 wherein the correlator arrangements each comprise first and second multiplicative mixers, each of the said first and second multiplicative mixers having two input terminals and an output terminal, one input terminal of each of the said mixers being coupled to the said first input port, the other input terminal of each mixer of the correlator arrangement being coupled to the second input port, differentiator means via which the said other input terminal of the first mixer is coupled to the second input port, first and second low pass filters fed respectively from the output terminals of the first and second mixers of the correlator arrangement and first and second voltage controllable potential divider means each having a control signal input terminal and two other terminals, the control signal input terminal of the said first and second voltage controllable potential divider means being fed from the first and second filters respectively, the first said potential divider means being connected by means of its said other terminals between the said other input terminal of the said first mixer of the correlator arrangement and the output port thereof and the said second potential divider means being similarly connected between the said second mixer of the correlator arrangement and the output port of the correlator arrangement.

4. A common channel duplex a.m. transceiver as claimed in claim 3 wherein the voltage controllable potential divider means comprises a voltage variable resistor connected effectively in series with a 180° phase shift device, the voltage variable resistor and the said phase shift device being connected in parallel with a further resistor, the control signal input terminal forming part of the voltage variable resistor and the parallel combination of the further resistor and the voltage variable resistor and the 180° phase shift means including the two other terminals which are provided one at each end of the said parallel combination.

5. A common channel duplex a.m. transceiver as claimed in claim 2 wherein the a.m. demodulator comprises two squarers fed respectively from the said pair of low pass filters, output signals from the squarers being fed to a signal combiner, an output signal from the signal combiner being fed to a square rooting device which provides an a.m. output signal corresponding to a.m. modulation carried by the received signals.

6. A common channel duplex a.m. transceiver as claimed in claim 2 wherein the a.m. demodulator comprises two full-wave rectifiers fed respectively from the said pair of low pass filters and arranged to feed a signal combiner which provides a.m. output signals corresponding to a.m. modulation carried by the received signals.

7. A common channel duplex a.m. transceiver as claimed in claim 2 wherein the phase quadrature means is connected so that the local oscillator signals fed from the oscillator/modulator means to the pair of multiplicative mixers are in phase quadrature.

8. A common channel duplex a.m. transceiver as claimed in claim 2 wherein the phase quadrature means is connected so that received signals fed from the receiver aerial means to the pair of multiplicative mixers are in phase quadrature.

* * * * *